United States Patent
Pickens

(10) Patent No.: US 10,816,429 B2
(45) Date of Patent: Oct. 27, 2020

(54) DETERMINING A MOMENT WEIGHT OF A COMPONENT BASED ON MEASURED SURFACE GEOMETRY/SOLID MODEL OF THE COMPONENT

(71) Applicant: United Technologies Corporation, Farmington, CT (US)

(72) Inventor: John T. Pickens, Wethersfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 173 days.

(21) Appl. No.: 16/213,270

(22) Filed: Dec. 7, 2018

(65) Prior Publication Data
US 2020/0182731 A1 Jun. 11, 2020

(51) Int. Cl.
G01M 1/12 (2006.01)
B23P 15/04 (2006.01)
G01M 1/10 (2006.01)

(52) U.S. Cl.
CPC ............... *G01M 1/10* (2013.01); *B23P 15/04* (2013.01); *G01M 1/122* (2013.01)

(58) Field of Classification Search
CPC .......... G01M 1/10; G01M 1/122; G01M 1/30; G01M 1/36; G01M 1/12; B23P 15/04; F01D 21/003; F01D 5/3061; F01D 5/34; F01D 5/30; F01D 5/027; F05D 2220/36; F05D 2270/8041; F04D 29/662
See application file for complete search history.

(56) References Cited

U.S. PATENT DOCUMENTS

| | | | |
|---|---|---|---|
| 5,195,363 A | 3/1993 | Gossler | |
| 7,572,101 B2 | 8/2009 | Mickol et al. | |
| 8,069,707 B2 | 12/2011 | Tragesser et al. | |
| 8,701,286 B2 | 4/2014 | Strother | |
| 8,887,564 B2 | 11/2014 | Harrison | |
| 2004/0013523 A1* | 1/2004 | Berger | F01D 5/027 416/1 |
| 2004/0202544 A1 | 10/2004 | Henning | |
| 2004/0234122 A1 | 11/2004 | Kochi | |
| 2006/0013692 A1* | 1/2006 | Henning | F01D 5/30 416/219 R |
| 2008/0027686 A1 | 1/2008 | Mollmann | |
| 2011/0296686 A1* | 12/2011 | Strother | F01D 5/027 29/889.2 |

(Continued)

FOREIGN PATENT DOCUMENTS

DE 102007045300 A1 4/2009
JP 6441603 2/1989

OTHER PUBLICATIONS

EP search report for EP19214128.1 dated Jul. 27, 2020.

*Primary Examiner* — Jun S Yoo
(74) *Attorney, Agent, or Firm* — Getz Balich LLC

(57) ABSTRACT

A method is provided during which surface data indicative of a measured surface geometry of a component is received. The surface data is processed to provide model data indicative of a solid model of the component. The model data is processed to determine a center of gravity distance of the component. A moment weight of the component is determined based on the center of gravity distance of the component and a measured weight of the component. The moment weight is communicated with the component.

20 Claims, 6 Drawing Sheets

(56) References Cited

U.S. PATENT DOCUMENTS

| | | | |
|---|---|---|---|
| 2011/0314909 A1* | 12/2011 | Harrison | F01D 5/027 73/455 |
| 2014/0166373 A1 | 6/2014 | Salm et al. | |
| 2018/0171803 A1* | 6/2018 | Lafitte | F01D 5/027 |

* cited by examiner

DETERMINING A MOMENT WEIGHT OF A COMPONENT BASED ON MEASURED SURFACE GEOMETRY/SOLID MODEL OF THE COMPONENT

BACKGROUND OF THE DISCLOSURE

1. Technical Field

This disclosure relates to a determining a moment weight of a component such as, but not limited to, a rotor blade of a turbine engine.

2. Background Information

Various systems and methods are known in the art for determining a moment weight of a component such as a rotor blade of a turbine engine. While these systems and methods have various benefits, there is still room in the art for improvement. For example, a typical moment weight measurement system requires a rotor blade to be properly positioned in a fixture. However, if the rotor blade is improperly positioned, the moment weight measurement system may provide an inaccurate moment weight measurement.

SUMMARY OF THE DISCLOSURE

According to an aspect of the present disclosure, a method is provided during which surface data is received indicative of a measured surface geometry of a component. The surface data is processed to provide model data indicative of a solid model of the component. The model data is processed to determine a center of gravity distance of the component. A moment weight of the component is determined based on the center of gravity distance of the component and a measured weight of the component. The moment weight is communicated with the component.

According to another aspect of the present disclosure, a manufacturing method is provided during which model data is received indicative of a solid model of a rotor blade. A center of gravity distance of the rotor blade is determined using the model data. A moment weight of the rotor blade is determined based on the center of gravity distance of the rotor blade and a measured weight of the rotor blade. A location for the rotor blade to be connected to a rotor hub is determined based on the moment weight. The rotor blade is connected to the rotor hub at the location.

According to another aspect of the present disclosure, an inspection method is provided during a weight of a rotor blade is determined to provide a measured weight of the rotor blade. A surface geometry of the rotor blade is measured using a surface inspection system to provide surface data indicative of the measured surface geometry. Model data is generated based on the surface data, where the model data is indicative of a solid model of the rotor blade. A center of gravity distance of the rotor blade is determined using the model data. A moment weight of the rotor blade is determined based on the center of gravity distance and the measured weight of the rotor blade. The moment weight is communicated with the rotor blade.

During the method, a surface inspection system may be operated to measure a surface geometry of the component and provide the surface data.

The surface inspection system may be configured as or otherwise include a coordinate measuring machine.

The surface inspection system may be configured as or otherwise include a non-contact inspection system.

The surface inspection system may be configured as or otherwise include a blue-light inspection system.

The center of gravity distance may be a radial center of gravity distance. The moment weight may be a radial moment weight of the component.

The determining of the moment weight of the component may include multiplying the center of gravity distance of the component by the measured weight of the component.

During the method, a weight of the component may be measured using a scale to provide the measured weight of the component.

The communicating of the moment weight with the component may include displaying the moment weight on the component.

The communicating of the moment weight with the component may include electronically linking the moment weight with the component.

During the method, a location for the component to be connected to a rotor hub is determined based on the communicated moment weight. The component may be configured as or otherwise include a rotor blade.

During the method, the rotor blade may be connected to the rotor hub at the location.

The component may be configured as or otherwise include a rotor blade.

The component may be configured as or otherwise include a fan blade.

The rotor blade may be configured as or otherwise include a fan blade.

During the method, a surface geometry of the rotor blade may be measured using a surface inspection system to provide surface data indicative of the surface geometry. The model data may be generated based on the surface data.

During the method, a weight of the rotor blade may be measured using a scale to provide the measured weight of the rotor blade.

The foregoing features and the operation of the invention will become more apparent in light of the following description and the accompanying drawings.

DETAILED DESCRIPTION

Figure 1:
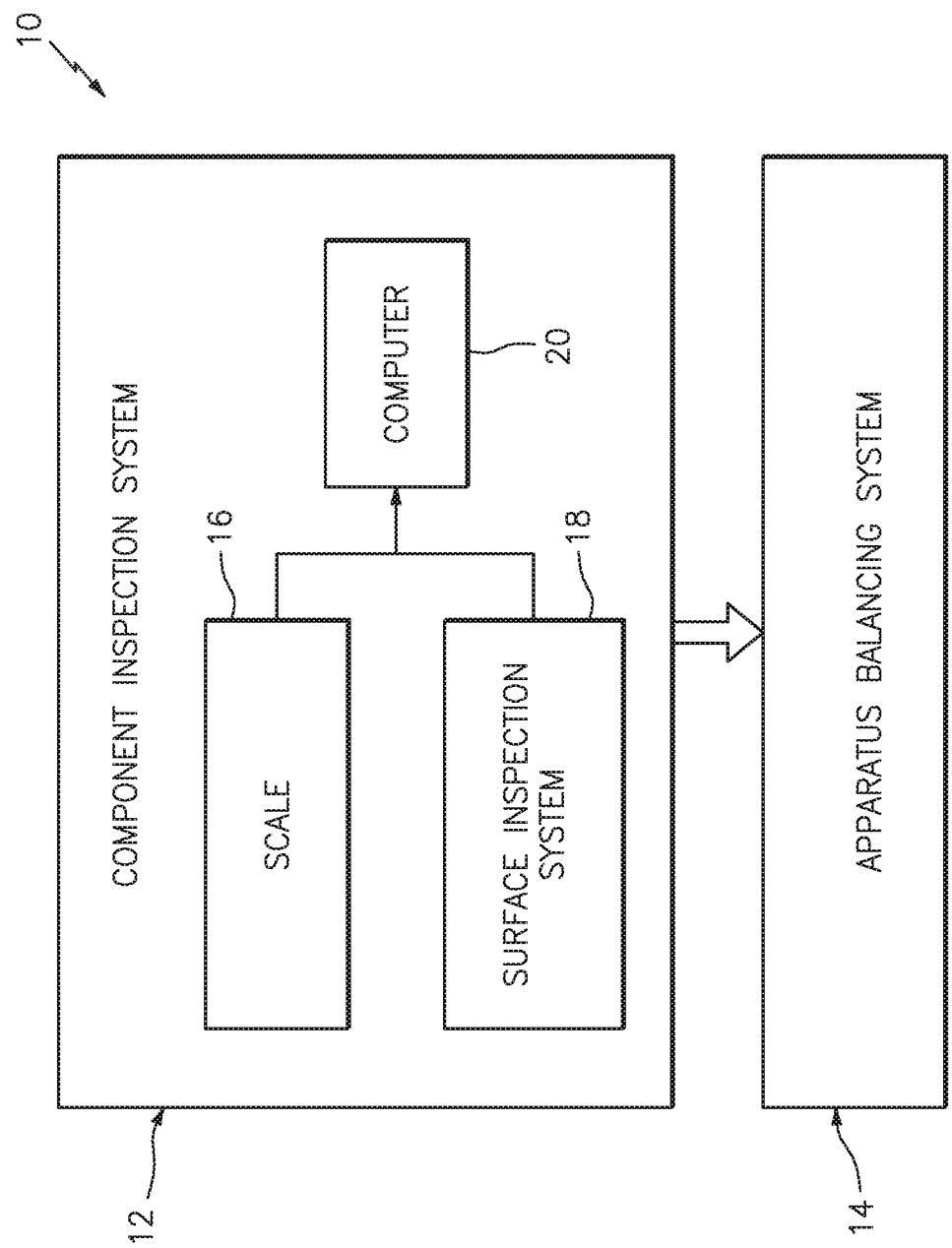
FIG. 1 is a schematic illustration of a system for use in manufacture of an apparatus such as a turbine engine rotor.

FIG. 1 is a schematic illustration of a system 10 for use in manufacture of an apparatus such as, but not limited to, a rotor for a turbine engine. This system 10 includes a component (e.g., rotor blade) inspection system 12 and an apparatus (e.g., rotor) balancing system 14. Note, while the component inspection system 12 and the apparatus balancing system 14 are illustrated in FIG. 1 as two separate systems, the present disclosure is not limited to such a configuration. In other embodiments, for example, the component inspection system 12 and the apparatus balancing system 14 may be configured as a single system or may share at least one common element; e.g., a computer.

The component inspection system 12 includes a scale 16, a surface inspection system 18 and a computer 20. The scale 16 is configured to measure a weight of a component placed therewith (e.g., thereon). Various scale types and configurations are known in the art, and the present disclosure is not limited to any particular ones thereof.

The surface inspection system 18 is configured to measure (e.g., map) a surface geometry of the component. This surface geometry may represent a select portion of a surface of the component, or an entirety of surface(s) exposed to the surface inspection system 18. The surface inspection system 18 may be a contact surface inspection system or a non-contact surface inspection system. The term "contact surface inspection system" may describe a surface inspection system that physically contacts a component to measure its surface geometry. An example of a contact surface inspection system is a coordinate measuring machine (CMM). The term "non-contact surface inspection system" may describe a surface inspection system that does not physically contact a component to measure its surface geometry. Examples of a non-contact surface inspection system include, but are not limited to, a blue light inspection system (e.g., a blue light optical scanner), a white light inspection system (e.g., a white light optical scanner), a laser inspection system (e.g., a laser scanning device) and a radiological inspection system (e.g., a computed axial tomography scanning (CAT Scan) device).

Figure 2:
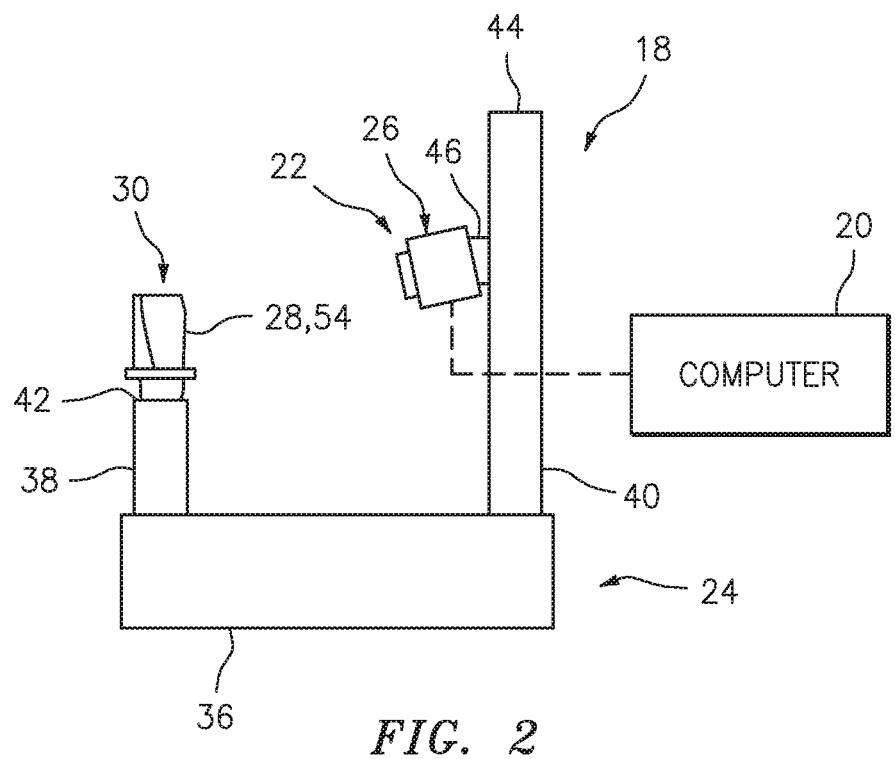
FIG. 2 is a schematic illustration of an exemplary surface inspection system arranged with a rotor and a computer.

Referring to FIG. 2, an exemplary embodiment of the surface inspection system 18 configured as a non-contact (e.g., blue or white light) surface inspection system is shown. This inspection system 18 includes an electronic measurement device 22 and a support stand 24.

Figure 3:
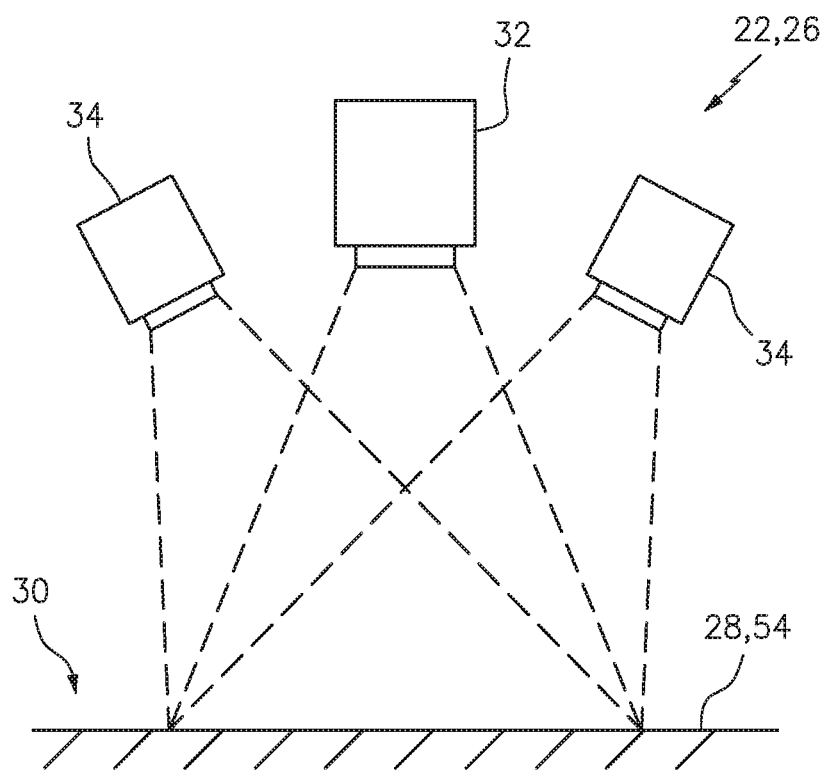
FIG. 3 is a schematic illustration of an exemplary non-contact sensor and a portion of the rotor.

Referring to FIGS. 2 and 3, the electronic measurement device 22 can include a non-contact sensor 26 (e.g., a blue or white light optical scanner) adapted to map at least a portion of a surface 28 of a component 30; e.g., a rotor blade. The term "map" is used herein to describe a process of applying a (e.g., high density) triangulated mesh of surface data points to a component surface. In the embodiment shown in FIG. 3, the non-contact sensor 26 includes a fringe pattern projector 32 and one or more cameras 34. The projector 32 is adapted to project a point, line and/or pattern of light (e.g., blue or white light). Each camera 34 is adapted to capture an image of the projected light. An example of such a projector and cameras is disclosed in U.S. Pat. No. 8,111,907, which is herein incorporated hereby reference in its entirety.

Referring to FIG. 2, the support stand 24 includes a base 36, a component support 38 and a sensor support 40. The component support 38 extends from the base 36 to a component support surface 42. The sensor support 40 extends from the base 36 to a first end 44. The sensor support 40 includes a sensor mount 46 disposed axially between the base 36 and the first end 44, which connects the non-contact sensor 26 to the sensor support 40.

Referring to FIG. 1, the computer 20 is in signal communication (e.g., hardwired and/or wirelessly connected) with the scale 16 and/or the surface inspection system 18 (e.g., the non-contact sensor 26 of FIG. 2). The computer 20 may be implemented with a combination of hardware and software. The hardware may include memory and at least one processing device, which may include one or more single-core and/or multi-core processors. The hardware may also or alternatively include analog and/or digital circuitry other than that described above. The memory is configured to store software (e.g., program instructions) for execution by the processing device, which software execution may control and/or facilitate performance of one or more operations such as those described in the methods below. The memory may be a non-transitory computer readable medium. For example, the memory may be configured as or include a volatile memory and/or a nonvolatile memory.

Figure 4:
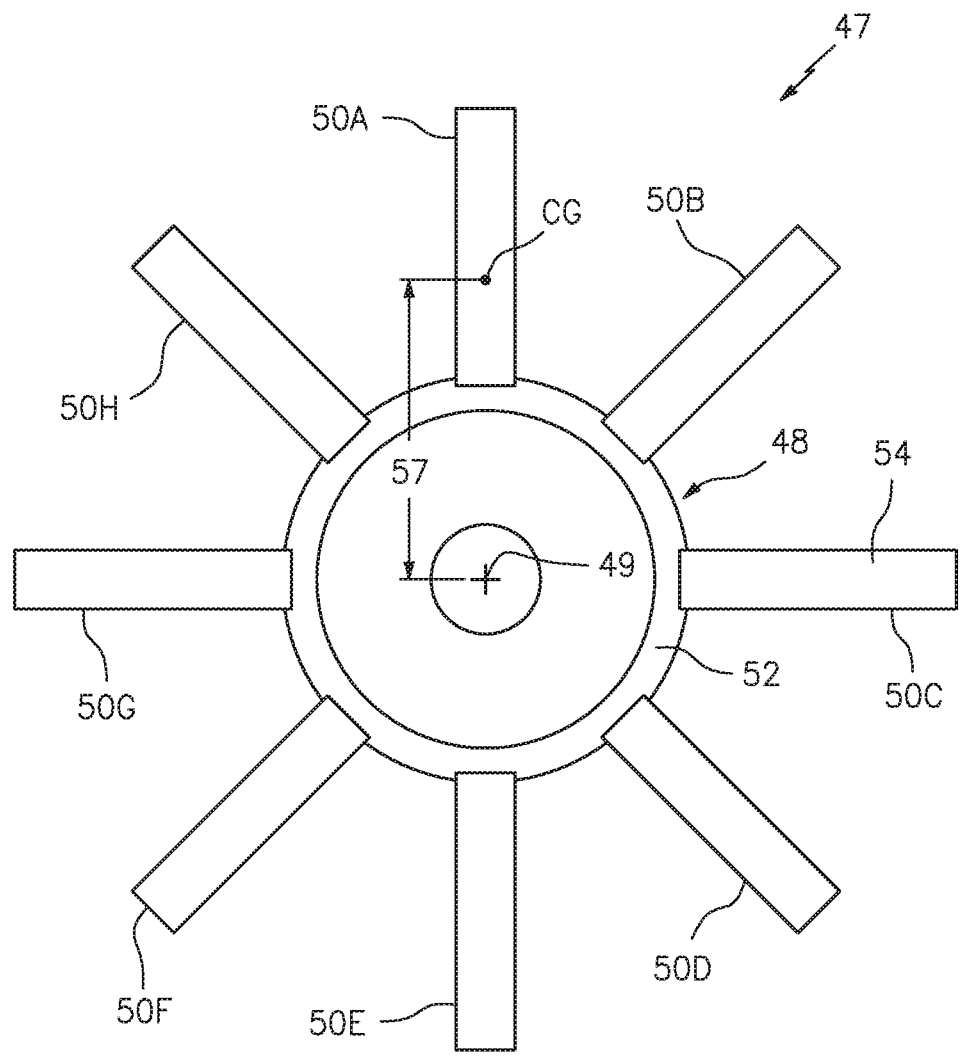
FIG. 4 is a schematic illustration of an exemplary rotor for a turbine engine.

The apparatus balancing system 14 is configured to determine placement of individual components (e.g., rotor blades) in a rotor 47 (see FIG. 4) based on associated component (e.g., rotor blade) moment weights, which rotor 47 is rotatable about a rotational axis 49. The apparatus balancing system 14, for example referring to FIG. 4, may be configured to assign rotor blade locations about a rotor disk 48 such that the combined moment weights of the rotor blades 50A-H (generally referred to as "50"), once properly located about and connected to a hub 52 of the rotor disk 48, cancel each other out; e.g., substantially zero out. For example, the rotor blade 50A may be diametrically located relative to the rotor blade 50E where those rotor blades 50A and 50E have substantially equal, but opposite acting, moment weights subsequent to being connected to the rotor disk 48. Various types and configuration of apparatus balancing systems are known in the art, and the present disclosure is not limited to any particular ones thereof.

Figure 5:
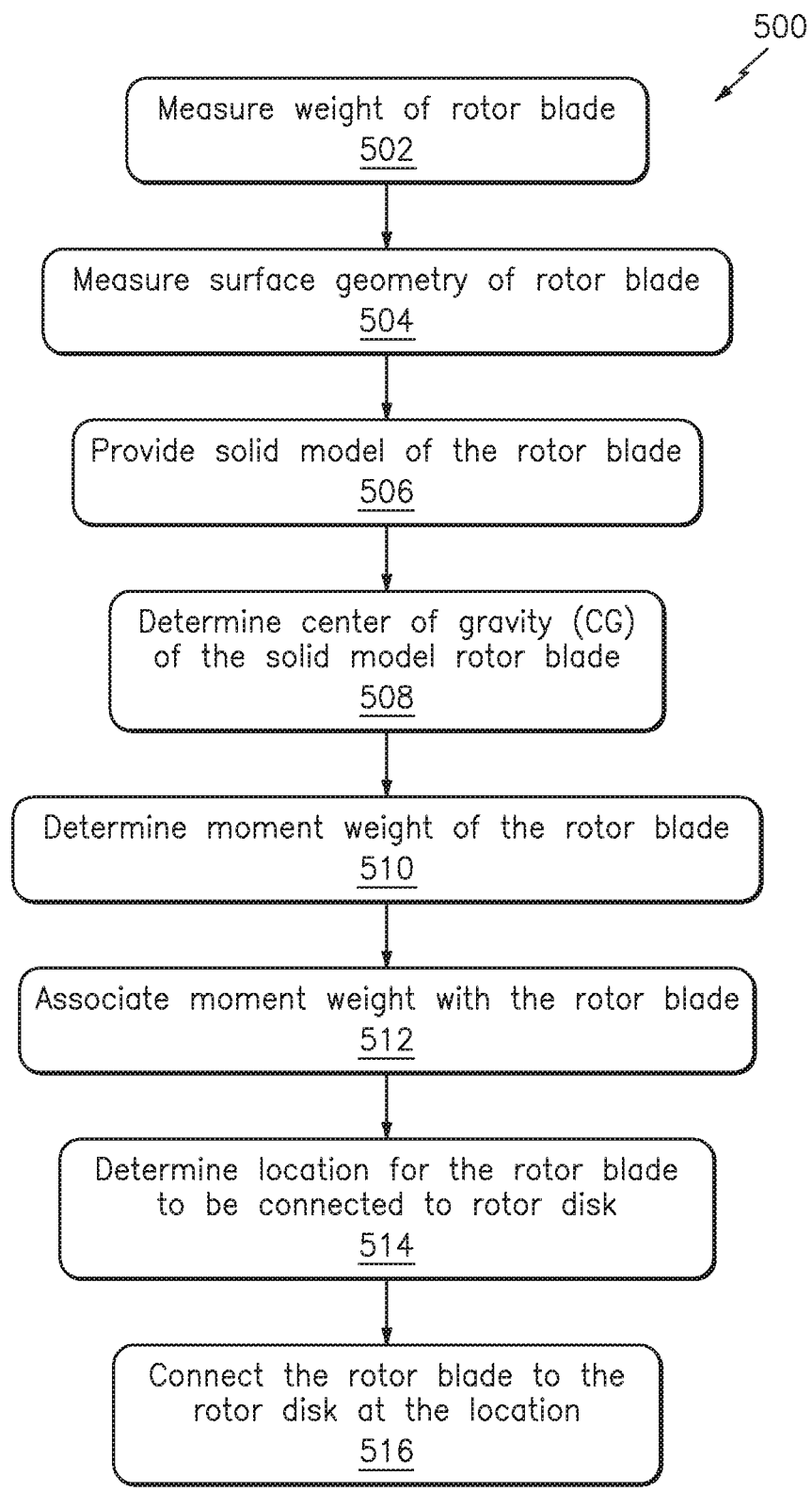
FIG. 5 is a flow diagram of a method involving a rotor blade.

FIG. 5 is a flow diagram of a method 500 utilizing a system such as the system 10 of FIG. 1. The method 500 is described below with reference to the component being a rotor blade 50 and the apparatus being a rotor 47 for ease of description. However, the present disclosure is not limited to any particular component or apparatus types or configurations.

In step 502, a weight (e.g., a pan weight) of the rotor blade 50 is measured. The rotor blade 50, for example, may be placed on the scale 16. The scale 16 outputs weight data to the computer 20, which weight data is indicative of a measured (e.g., actual, pan) weight of the rotor blade 50. Alternatively, the weight of the rotor blade 50 may be determined later in step 508 by processing model data (see step 506) with a known material density and/or other parameter of the rotor blade 50.

In step 504, a surface geometry of a surface 54 of the rotor blade 50 is measured (e.g., mapped). The surface inspection system 18, for example, may be operated to measure (e.g., map a mesh of coordinates of) at least a portion or an entirety of the rotor blade surface 54. The surface inspection system 18 outputs surface data to the computer 20, which surface data is indicative of the measured surface geometry of the rotor blade 50.

In step 506, a solid model of the rotor blade 50 is provided. This solid model may electronically represent of an entirety (or a portion) of the rotor blade 50. The computer 20, for example, may be operated to process the surface data with one or more algorithms and/or programs to generate model data indicative of the solid model of the rotor blade 50. Various algorithms and programs for generating a solid model based on a surface geometry are known in the art, and the present disclosure is not limited to any particular ones thereof.

In step 508, a center of gravity (CG) distance of the rotor blade 50 is determined. Herein, the term "center of gravity distance" may describe a distance (e.g., distance 57 of FIG. 4) between a rotational axis (e.g., the rotational axis 12) and a center of gravity point (CG) of an object (e.g., the rotor blade 50). The computer 20, for example, may be operated to process the model data and a known material density or other parameter of the rotor blade 50 with one or more algorithms and/or programs to generate CG data indicative of the center of gravity distance of the rotor blade 50. Various algorithms and programs for generating a center of gravity based on a solid model and a material density are known in the art, and the present disclosure is not limited to any particular ones thereof.

In step 510, a moment weight of the rotor blade 50 is determined. The computer 20, for example, may be operated to process the CG data and the weight data to provide moment weight data indicative of the moment weight. In particular, the computer 20 may multiply the center of gravity distance of the rotor blade 50 by the measured weight of the rotor blade 50 to determine the moment weight of the rotor blade 50.

In step 512, the moment weight is associated with (e.g., communicated with and/or assigned to) the rotor blade 50. The moment weight, for example, may be handwritten, printed and/or otherwise displayed on a root and/or airfoil of the rotor blade 50. The moment weight may also or alternatively be displayed on packaging material (e.g., a box or crate) for the rotor blade 50. The moment weight may still also or alternatively be electronically associated with the rotor blade 50. For example, a rotor blade serial number may be electronically linked with the moment weight. The present disclosure, of course, is not limited to the foregoing exemplary techniques for communicating/assigning the moment weight of a rotor blade.

In step 514, a location for the rotor blade 50 to be connected to the rotor hub 52 is determined. The apparatus balancing system 14 receives the moment weight data associated with the rotor blade 50, as well as moment weight data associated with other rotor blades 50. Alternatively, the moment weight associated with the rotor blade 50, as well as the moment weights associated with other rotor blades 50, may be input into the apparatus balancing system 14. Note, the moment weight data/moment weights associated with other rotor blades 50 may be determined and provided to the apparatus balancing system 14 following additional iterations of steps 502, 504, 506, 508, 510 and 512 for the other rotor blades 50. The apparatus balancing system 14 processes the received moment weight data/moment weights with one or more algorithms and/or programs to determine locations at which the rotor blades 50 may be connected to the hub 52 such that the rotor 47 is rotationally balanced (as much as possible) during rotor rotation. The apparatus balancing system 14 then provides (e.g., outputs data indicative of, displays, etc.) the locations associated with each of the rotor blades 50.

In step 516, each of the rotor blades 50 (represented by the moment weight data/moment weights processed by the apparatus balancing system 14) is connected to the rotor hub 52 at a respective one of the locations determined in the balancing step 514. These connections may be mechanical connections (e.g., dovetail blade root into corresponding slot in the hub 52) or bonded connections in the case of an integrally bladed rotor (IBR) (also referred to as a "blisk") for example.

Figure 6A:
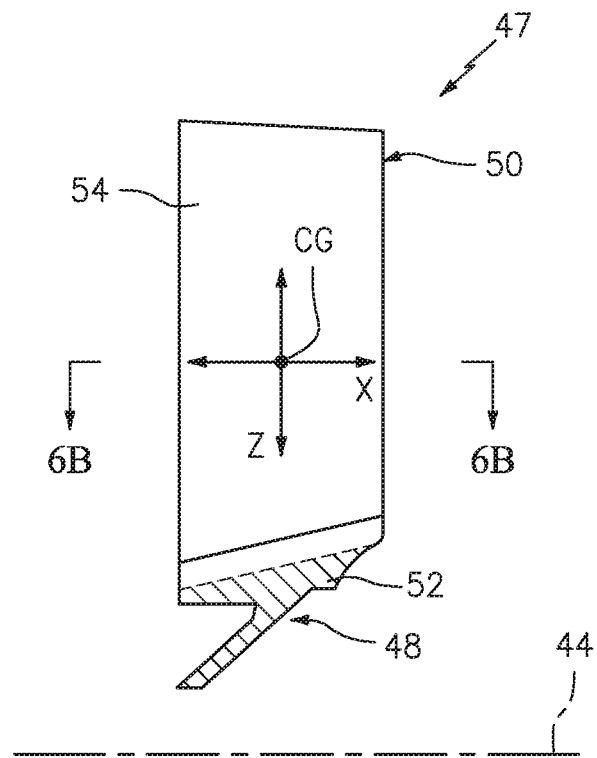
FIG. 6A is a partial side sectional illustration of the rotor of FIG. 4.
Figure 6B:
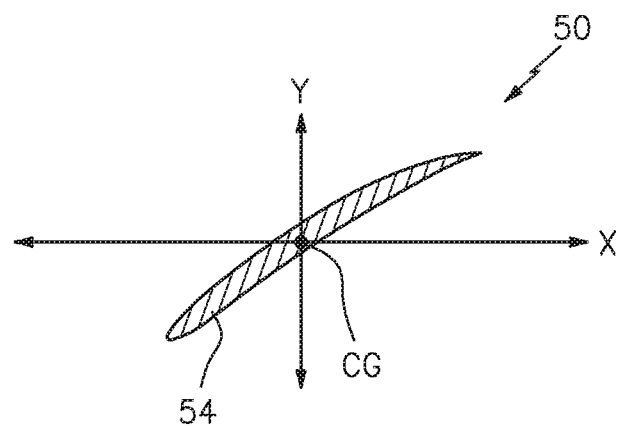
FIG. 6B is a cross-sectional illustration of the rotor blade of FIG. 6A taken along line 6B-6B.

Referring to FIGS. 6A and 6B, a moment weight of each rotor blade 50 may be categorized into three components: an axial moment weight (e.g., along x-axis); a tangential moment weight (e.g., along y-axis); and a radial moment weight (e.g., along z-axis). The axial moment weight is measured along the rotational axis 49 of the rotor 47. The tangential moment weight is measured in a direction than is tangent to a circle around the rotational axis 49. The radial moment weight is measure along a ray projecting out from the rotational axis 49 of the rotor 47. The method 500 above may be performed for all three components of the moment weight. Alternatively, the method 500 may be performed for a single one (or select two) of the three components of the moment weight. For example, in some embodiments, the moment weight determined in the step 510 may be a radial moment weight. In such embodiments, the center of gravity distance determined in the step 508 may be a radial center of gravity distance.

The inventor of the present disclosure has discovered that a radial moment weight of a rotor blade is typically significantly larger than an axial or a tangential moment weight of the same rotor blade. Therefore, focusing the method 500 on the radial moment weight may reduce complexity while still providing accurate results.

The rotor blade 50 may be any type of rotor blade included in a turbine engine. The rotor blade 50, for example, may be configured as a fan blade, a compressor blade or a turbine blade.

Figure 7:
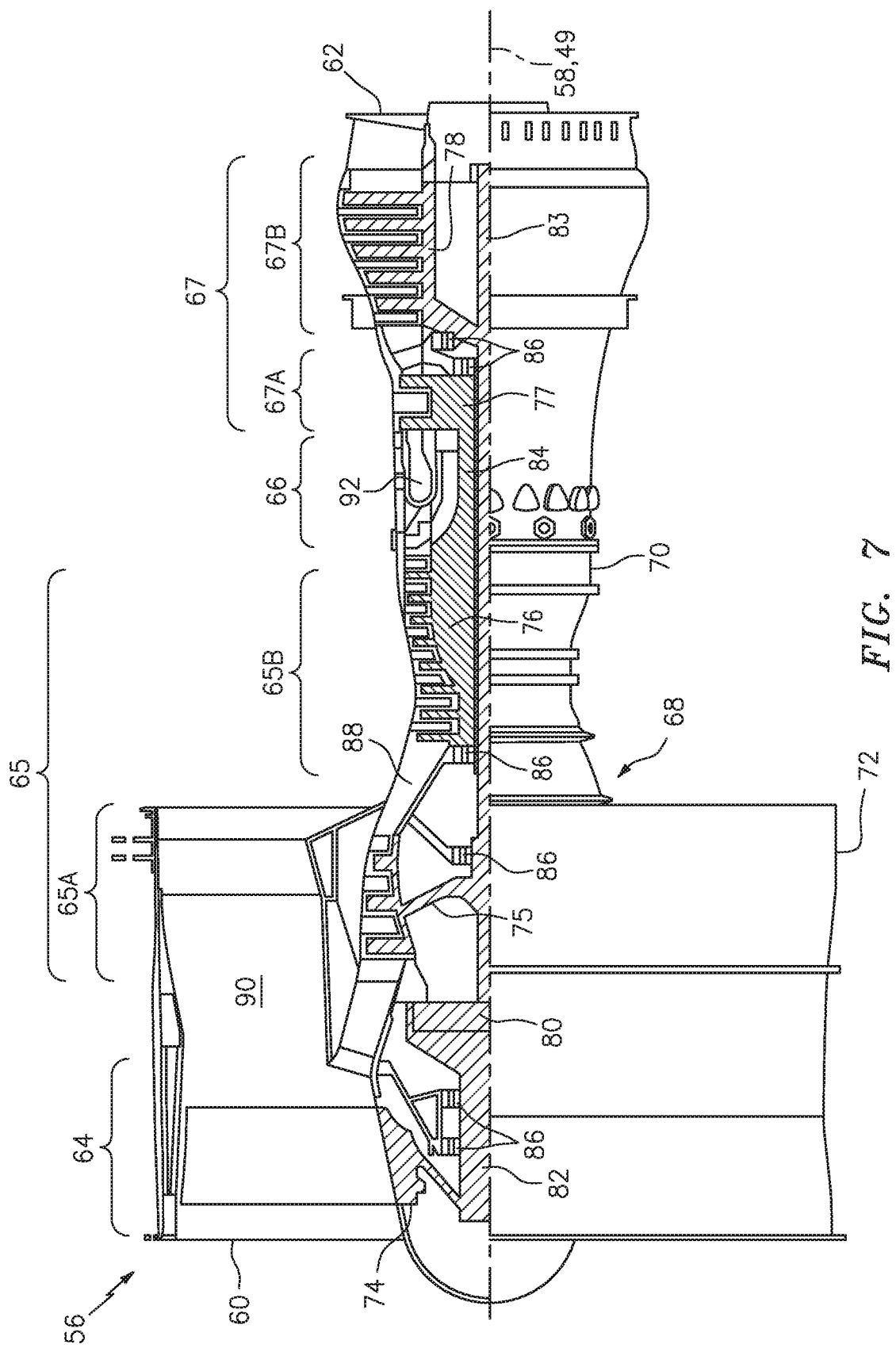
FIG. 7 is a partial side cutaway illustration of an exemplary geared turbofan turbine engine.

FIG. 7 is a side cutaway illustration of a geared turbofan turbine engine 56 in which the rotor blade 50 or rotor blades 50 involved in the method 500 may be included. This turbine engine 56 extends along an axial centerline 58, which may be coaxial with the rotational axis 49 (see FIG. 4), between an upstream airflow inlet 60 and a downstream airflow exhaust 62. The turbine engine 56 includes a fan section 64, a compressor section 65, a combustor section 66 and a turbine section 67. The compressor section 65 includes a low pressure compressor (LPC) section 65A and a high pressure compressor (HPC) section 65B. The turbine section 67 includes a high pressure turbine (HPT) section 67A and a low pressure turbine (LPT) section 67B.

The engine sections 64-67 are arranged sequentially along the centerline 58 within an engine housing 68. This housing 68 includes an inner case 70 (e.g., a core case) and an outer case 72 (e.g., a fan case). The inner case 70 may house one or more of the engine sections 65A-67B; e.g., an engine core. The outer case 72 may house at least the fan section 64.

Each of the engine sections 64, 65A, 65B, 67A and 67B includes a respective rotor 74-78; e.g., see FIG. 1. Each of these rotors 74-78 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 74 is connected to a gear train 80, for example, through a fan shaft 82. The gear train 80 and the LPC rotor 75 are connected to and driven by the LPT rotor 78 through a low speed shaft 83. The HPC rotor 76 is connected to and driven by the HPT rotor 77 through a high speed shaft 84. The shafts 82-84 are rotatably supported by a plurality of bearings 86; e.g., rolling element and/or thrust bearings. Each of these bearings 86 is connected to the engine housing 68 by at least one stationary structure such as, for example, an annular support strut.

During operation, air enters the turbine engine 56 through the airflow inlet 60. This air is directed through the fan section 64 and into a core gas path 88 and a bypass gas path 90. The core gas path 88 extends sequentially through the engine sections 65A-67B. The air within the core gas path 88 may be referred to as "core air". The bypass gas path 90 extends through a bypass duct, which bypasses the engine core. The air within the bypass gas path 90 may be referred to as "bypass air".

The core air is compressed by the compressor rotors 75 and 76 and directed into a combustion chamber 92 of a combustor in the combustor section 66. Fuel is injected into the combustion chamber 92 and mixed with the compressed core air to provide a fuel-air mixture. This fuel air mixture is ignited and combustion products thereof flow through and sequentially cause the turbine rotors 77 and 78 to rotate. The rotation of the turbine rotors 77 and 78 respectively drive rotation of the compressor rotors 76 and 75 and, thus, compression of the air received from a core airflow inlet. The rotation of the turbine rotor 78 also drives rotation of the fan rotor 74, which propels bypass air through and out of the bypass gas path 90. The propulsion of the bypass air may account for a majority of thrust generated by the turbine engine 56, e.g., more than seventy-five percent (75%) of engine thrust. The turbine engine 56 of the present disclosure, however, is not limited to the foregoing exemplary thrust ratio.

The rotor 47 and its rotor blades 50 may be included in various turbine engines other than the one described above as well as in other types of rotational equipment. The rotor 47 and its rotor blades 50, for example, may be included in a geared turbine engine where a gear train connects one or more shafts to one or more rotors in a fan section, a compressor section and/or any other engine section. Alternatively, rotor 47 and its rotor blades 50 may be included in a turbine engine configured without a gear train. The rotor 47 and its rotor blades 50 may be included in a geared or non-geared turbine engine configured with a single spool, with two spools (e.g., see FIG. 7), or with more than two spools. The turbine engine may be configured as a turbofan engine, a turbojet engine, a propfan engine, a pusher fan engine or any other type of turbine engine. The present disclosure therefore is not limited to any particular types or configurations of turbine engines or other equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method, comprising:
    receiving surface data indicative of a measured surface geometry of a component;
    processing the surface data to provide model data indicative of a solid model of the component;
    processing the model data to determine a center of gravity distance of the component;
    determining a moment weight of the component based on the center of gravity distance of the component and a measured weight of the component; and
    communicating the moment weight with the component.

2. The method of claim 1, further comprising operating a surface inspection system to measure a surface geometry of the component and provide the surface data.

3. The method of claim 2, wherein the surface inspection system comprises a coordinate measuring machine.

4. The method of claim 2, wherein the surface inspection system comprises a non-contact inspection system.

5. The method of claim 2, wherein the surface inspection system comprises a blue-light inspection system.

6. The method of claim 1, wherein the center of gravity distance is a radial center of gravity distance, and the moment weight is a radial moment weight of the component.

7. The method of claim 1, wherein the determining of the moment weight of the component comprises multiplying the center of gravity distance of the component by the measured weight of the component.

8. The method of claim 1, further comprising measuring a weight of the component using a scale to provide the measured weight of the component.

9. The method of claim 1, wherein the communicating of the moment weight with the component comprises displaying the moment weight on the component.

10. The method of claim 1, wherein the communicating of the moment weight with the component comprises electronically linking the moment weight with the component.

11. The method of claim 1, further comprising determining a location for the component to be connected to a rotor hub based on the communicated moment weight, wherein the component comprises a rotor blade.

12. The method of claim 11, further comprising connecting the rotor blade to the rotor hub at the location.

13. The method of claim 1, wherein the component comprises a rotor blade.

14. The method of claim 1, wherein the component comprises a fan blade.

15. A manufacturing method, comprising:
    receiving model data indicative of a solid model of a rotor blade;
    determining a center of gravity distance of the rotor blade using the model data;
    determining a moment weight of the rotor blade based on the center of gravity distance of the rotor blade and a measured weight of the rotor blade;
    determining a location for the rotor blade to be connected to a rotor hub based on the moment weight; and
    connecting the rotor blade to the rotor hub at the location.

16. The manufacturing method of claim 15, wherein the rotor blade comprises a fan blade.

17. The manufacturing method of claim 15, further comprising:
    measuring a surface geometry of the rotor blade using a surface inspection system to provide surface data indicative of the surface geometry; and
    generating the model data based on the surface data.

18. The manufacturing method of claim 17, wherein the surface inspection system comprises a blue light inspection system.

19. The manufacturing method of claim 15, further comprising measuring a weight of the rotor blade using a scale to provide the measured weight of the rotor blade.

20. An inspection method, comprising:
    determining a weight of a rotor blade to provide a measured weight of the rotor blade;
    measuring a surface geometry of the rotor blade using a surface inspection system to provide surface data indicative of the measured surface geometry;
    generating model data based on the surface data, the model data indicative of a solid model of the rotor blade;
    determining a center of gravity distance of the rotor blade using the model data;

determining a moment weight of the rotor blade based on the center of gravity distance and the measured weight of the rotor blade; and communicating the moment weight with the rotor blade.

\* \* \* \* \*